(12) United States Patent
Lin

(10) Patent No.: US 8,308,474 B2
(45) Date of Patent: Nov. 13, 2012

(54) AIR GUIDE SHAFT

(76) Inventor: Hsi-Tong Lin, Taipei County (TW)

( * ) Notice: Subject to any disclaimer, the term of this patent is extended or adjusted under 35 U.S.C. 154(b) by 0 days.

(21) Appl. No.: 12/779,064

(22) Filed: May 13, 2010

(65) Prior Publication Data

US 2011/0280979 A1 Nov. 17, 2011

(51) Int. Cl.
*B29C 45/63* (2006.01)
(52) U.S. Cl. ........................................ 425/546; 425/812
(58) Field of Classification Search .................. 425/546, 425/812
See application file for complete search history.

(56) References Cited

U.S. PATENT DOCUMENTS

| 5,092,759 A | * | 3/1992 | Lichtinger et al. ............ 425/546 |
| 5,874,116 A | * | 2/1999 | Takano ......................... 425/812 |

\* cited by examiner

*Primary Examiner* — Tim Heitbrink

(57) ABSTRACT

An air guide shaft capable of filling to the air guide holes of a mold for guiding air and prevent large particles from flowing out comprises a stop being a round cylinder for stopping material; an air guide having a plurality of axial trenches extending from a body of the air guide; one end of the air guide being a taper end; the air guide serving for guiding air to flow out; and a neck connected between the stop and the air guide; and The air guide shaft is tightly engaged into an air releasing hole of a mold. Thus, large particles of the material within the mold will not flow out from the hole, while air within the mold will flow out from the hole. The final product molded from the mold has a perfect outer side.

2 Claims, 1 Drawing Sheet

AIR GUIDE SHAFT

FIELD OF THE INVENTION

The present invention relates to molding process, and in particular to air guide shaft capable of filling to an air guide hole of a mold for guiding air and prevent large particles from flowing out.

BACKGROUND OF THE INVENTION

In a molding process, air is accumulated within the mold so as to mix with the material within the mold. As a result, the product produced from the mold will accumulate with air so as to affect the quality of the product. Thus, generally, the mold is formed with a plurality of air holes for releasing air within the mold. However, the air holes will cause the material within the mold to accumulate in the air holes so that the outer surface of the product produced from the mold is formed with protrusions which are formed of the material accumulated in the holes.

Thus, there is a demand for a novel design which can improve the above mentioned prior art defects.

SUMMARY OF THE INVENTION

Accordingly, the primary object of the present invention is to provide an air guide shaft capable of filling to an air guide hole of a mold for guiding air and prevent large particles from flowing out.

To achieve the above objects, the present invention provides an air guide shaft capable of filling the air guide holes of a mold for guiding air and preventing large particles from flowing out. The shaft comprises: a stop being a round cylinder for stopping material; an air guide having a plurality of axial trenches extending from a body of the air guide; one end of the air guide being a taper end; the air guide serving for guiding air to flow out; and a neck connected between the stop and the air guide. The air guide shaft is tightly engaged into an air releasing hole of a mold; thus, large particles of the material within the mold will not flow out from the hole; while air within the mold will flow out from the hole; thus the final product molded from the mold has a perfect outer side since no air accumulates in the product; moreover, no large particle will accumulate in the hole and thus the product can present a beautiful outlook.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention.

Figure 1:
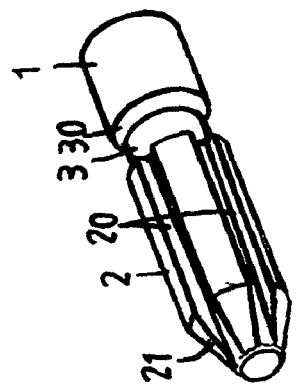
FIG. 1 is a perspective view of the present invention.
Figure 2:
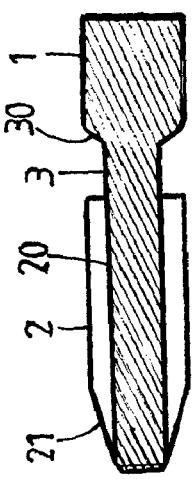
FIG. 2 is a schematic cross sectional view of the present invention.

With reference to FIGS. 1 and 2, the structure of the present invention is illustrated. The present invention relates to an air guide shaft capable of filling an air guide hole of a mold for guiding air and prevent large particles from flowing out. The present invention includes the following elements.

The air guide shaft is composed of a stem 1, a neck 3 and a body. The stem 1 is a round cylinder for stopping material.

The body has a plurality of axial trenches 20 and separators 2. One end of each the separator 2 is a tapered end 21. The body serves to guide air to flow out.

The neck 3 is connected between the stem 1 and the body. A portion of the neck 3 connected to the stem 1 is formed as an inclined tapered portion 30. A large side of the inclined tapered portion 30 is connected to the stem 1.

Figure 3:
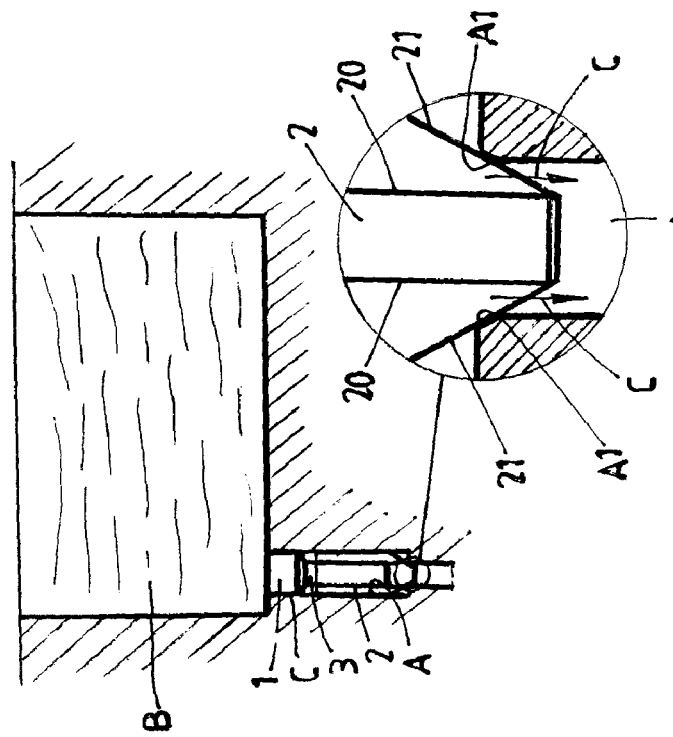
FIG. 3 is a schematic cross sectional view showing the application of the present invention.

The use of the present invention is illustrated in FIG. 3. In FIG. 3, it is illustrated that a mold is formed with a hole A. The air guide shaft of the present invention is placed into the hole A and is tightly engaged with a wall of the hole A. Thus, large particles of the material B within the mold will not flow out from the hole A, while air C within the mold will flow out from the hole A. Thus the final product molded from the mold has a perfect outer side since no air accumulates in the product. Moreover, no large particle will accumulate in the hole A and thus the product can present a smooth outlook.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An air guide shaft comprising:
   a stem being a round cylinder for stopping material;
   a body having a plurality of axial trenches and separators, each axial trench being extended from a rearmost end of the body to a foremost end of the body, one end of each separator being tapered, and an axial length of the stem being shorter than an axial length of the body; and
   a neck connected between the stem and the body.

2. The air guide shaft as claimed in claim 1, wherein a portion of the neck connected to the stem is formed as an inclined tapered portion.

* * * * *